No. 794,291. PATENTED JULY 11, 1905.
W. D. FORD-SMITH & T. COVENTRY.
CLUTCH MECHANISM.
APPLICATION FILED NOV. 16, 1903.

3 SHEETS—SHEET 1.

Attest
Edward Santon
L. B. Middleton

Inventors
William Dunstan Ford-Smith
Theodore Coventry
by Ellis Spear & Company
Attys No. 794,291. PATENTED JULY 11, 1905.
W. D. FORD-SMITH & T. COVENTRY.
CLUTCH MECHANISM.
APPLICATION FILED NOV. 16, 1903.

3 SHEETS—SHEET 2.

No. 794,291. PATENTED JULY 11, 1905.
W. D. FORD-SMITH & T. COVENTRY.
CLUTCH MECHANISM.
APPLICATION FILED NOV. 16, 1903.

3 SHEETS—SHEET 3.

Attest
Edward Sartou
L. B. Middleton

Inventors
William Dunstan Ford-Smith
Theodore Coventry
by Ellis Spear & Company
Attys No. 794,291.

Patented July 11, 1905.

UNITED STATES PATENT OFFICE.

WILLIAM DUNSTAN FORD-SMITH AND THEODORE COVENTRY, OF SALFORD, ENGLAND.

CLUTCH MECHANISM.

SPECIFICATION forming part of Letters Patent No. 794,291, dated July 11, 1905.

Application filed November 16, 1903. Serial No. 181,370.

*To all whom it may concern:*

Be it known that we, WILLIAM DUNSTAN FORD-SMITH and THEODORE COVENTRY, engineers, subjects of the King of Great Britain and Ireland, and residents of Gresley Iron Works, Salford, in the county of Lancaster, England, have invented certain new and useful Improvements in Clutch Mechanism, (for which we have made application for Letters Patent in Great Britain, No. 17,444, dated August 11, 1903,) of which the following is a specification.

Our invention relates to clutch mechanism; and it consists of the features and arrangement and combination of parts hereinafter described, and particularly pointed out in the claims.

Figure 1:
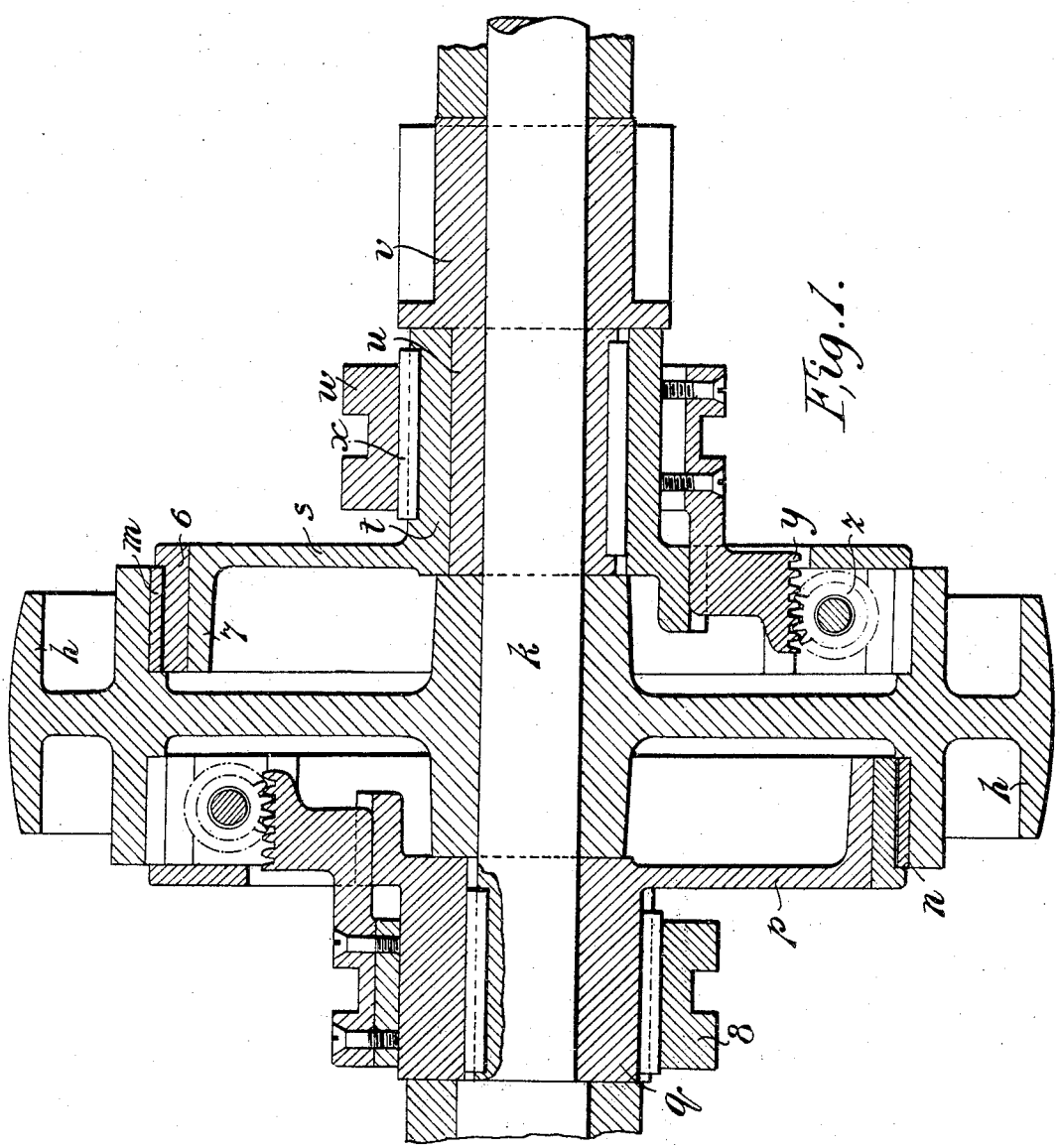
Figure 2:
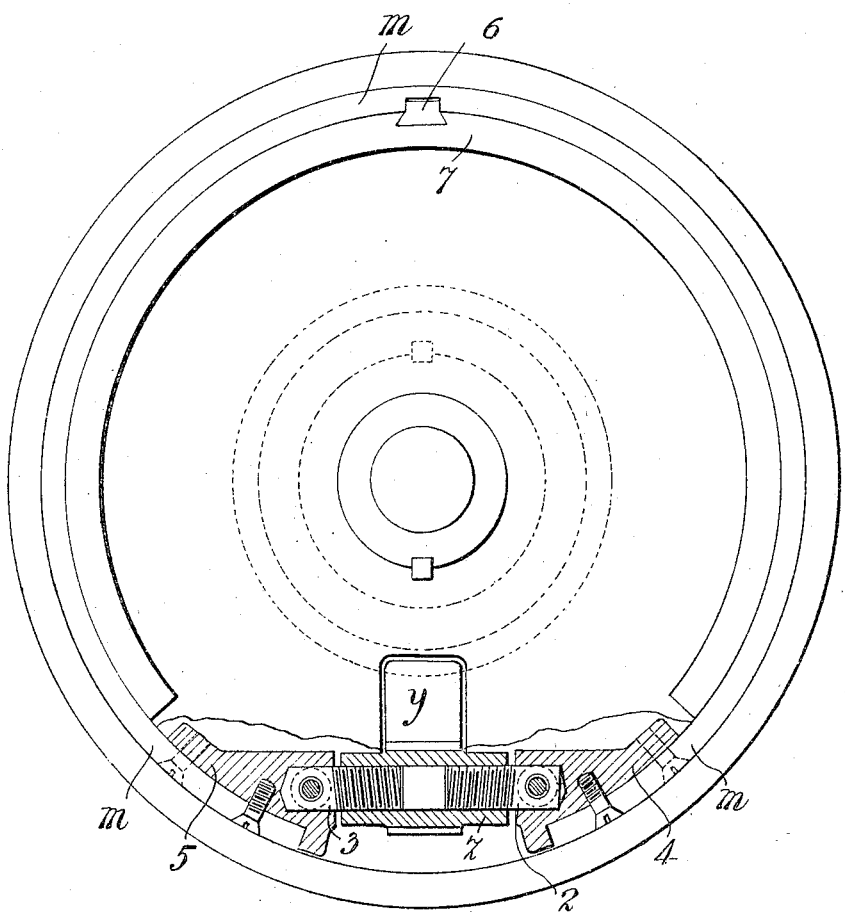
Figure 3:
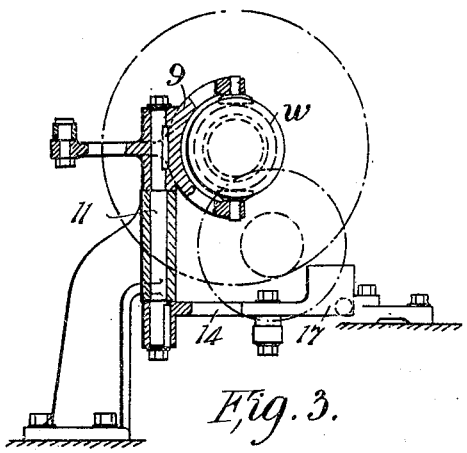
Figure 4:
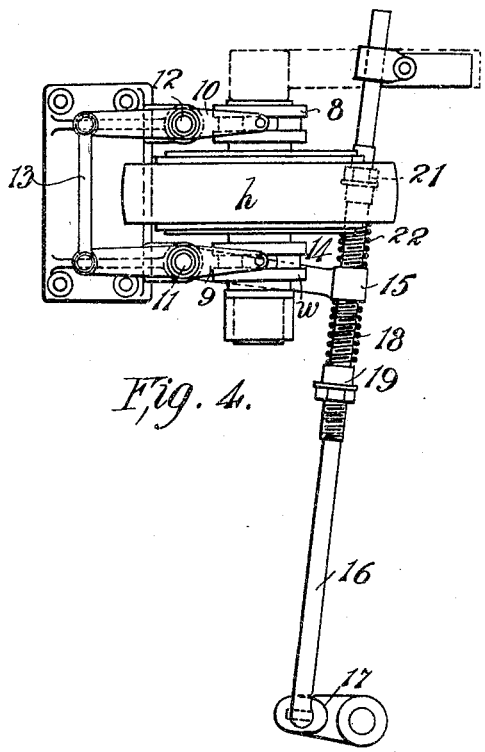
Figure 5:
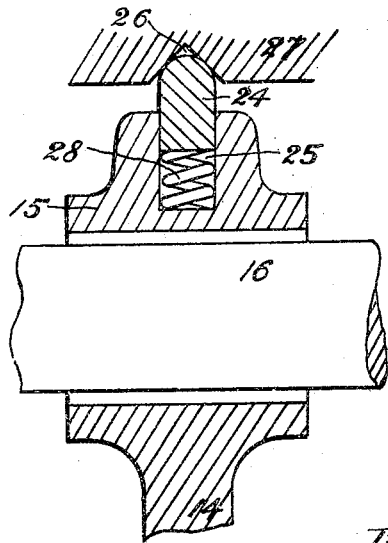

Referring now to the accompanying drawings, which illustrate how our invention can be carried into effect in one convenient manner, Figure 1 is a vertical section of the driving-pulley, clutches, &c. Fig. 2 is an end view, partly in section, of the same. Fig. 3 is an end elevation, partly in section, of the mechanism for actuating the clutches. Fig. 4 is a plan of the same. Fig. 5 is a detail drawing which will be referred to hereinafter.

The single driving-pulley $h$ is mounted loosely on the shaft $k$. The inside of the rim of this pulley at the left-hand side in Fig. 1 forms part of a clutch, of which the other part is formed by the ring $n$, carried by the disk $p$, the boss $q$ of which is keyed on the shaft. The right-hand part of the rim of the pulley also acts as a clutch. The inside portion $m$ of this right-hand clutch is carried by a disk $s$, the boss $t$ of which is keyed to a sleeve $u$, formed integral with a pinion $v$. The pinion $v$ is mounted loosely on the shaft. This construction may be modified so long as the disk $s$ is free on the shaft and is rigid as regards rotation with the pinion $v$.

On the boss $t$ is mounted a sleeve $w$. This sleeve can move longitudinally on the boss $t$, but the two are forced to rotate together by the feather $x$. The sleeve $w$ is provided with a toothed rack $y$, adapted to engage with the teeth of a small pinion $z$. This pinion $z$, as can be seen in Fig. 2, has an axial hole bored through it and screwed at the two ends respectively with right and left hand threads. These left and right hand internal threads engage with corresponding external threads on studs 2 3. The ends of these studs are pivoted to the blocks 4 and 5, to which are attached the ends of the incomplete ring $m$, which forms the inner portion of the clutch shown at the right hand in Fig. 1. The middle part of the incomplete ring $m$ is attached, as shown in Fig. 2, by the key 6 to the flange 7 of the disk $s$. The consequence of this construction is that when the sleeve $w$ is moved from left to right in Fig. 1 the pinion $z$ is rotated so as to draw toward each other the blocks 4 and 5, and thus draw the interior part $m$ of the clutch away from the exterior part. The result will be that the pinion $v$ will be disengaged from the pulley $h$. When the sleeve $w$ is moved from right to left in Fig. 1, the blocks 4 and 5 will be thrust apart, the two portions of the clutch will engage with each other, and the pinion $v$ be forced to rotate with the pulley $h$. A similar construction is arranged with regard to the other clutch, so that when the sleeve 8 is forced from left to right the shaft $k$ is forced to rotate with the pulley $h$, while if the sleeve 8 is moved from right to left the shaft $k$ is freed from the pulley $h$.

Referring now to Figs. 3 and 4, the sleeves $w$ and 8 are actuated by means of forks 9 and 10. These forks are pivotally supported, respectively, at 11 and 12. One end of one fork is connected to the corresponding end of the other fork by the link 13, so that the two forks move together. The pivot-pin 11 of the fork 9 has keyed to it a lever 14. The free end of this lever is formed as a boss 15, (see Fig. 4,) and through this boss works a rod 16, which is actuated by the tumbler 17. This tumbler is also used for giving the feed to the tool-box. A collar 19 is provided on the rod 16, and between this collar and the boss 15 is placed a coil-spring 18. A motion of the tumbler 17, which moves the rod 16 and collar 19 away from the tumbler, consequently acts, by means of the spring 18 on the boss 15, so as to move the lever 14 in the same direction. The sleeves $w$ and 8 are consequently moved from right to left in Fig. 1, the left-hand clutch is put out of gear, and immediately afterward the right-hand clutch is put into gear. When the rod 16 is given by the tumbler a motion in the reverse direction, a collar 21 and spring 22 come into play, the lever 14 is pulled toward the tumbler, the right-hand clutch is released, and the left-hand clutch is put into gear. The shaft $k$ and the pinion $v$ are consequently alternately rotated, and the table can thus be given motion in both directions by means of the one driving-pulley, which always rotates in the same direction.

It will be obvious that we can employ practically any length of coil-spring 18 22 that we desire, as we can compress either spring during any fraction of the stroke of the table that we consider necessary to obtain the amount of feed required. The clutches will not be affected till the necessary compression is put on the acting spring. The collars 19 21 are adjustable on the rod 16.

We can, if desired, lock the lever 14 in either of the two extreme positions by means of a pin 24, (see Fig. 5,) which works in a hole 25, provided in the boss 15 at the end of the lever 14. The outer end of this pin engages in one of two holes 26, cut in a stationary bar or member 27, carried by the frame of the machine. When the lever comes to either end of its stroke, it is pushed into the hole by means of the spring 28. The pin remains in the hole 26 until sufficient pressure is exerted on the boss 15 by the spring 18 or 22. The pin will then move inward against the action of the spring 28, and thus allow the lever 14 to be moved into another position. The holes 26 and the end of the pin 24 may be shaped as found desirable.

We do not confine ourselves to the form of clutch which has been described, but may employ any suitable form of clutch.

Having now described our invention, what we claim as new, and desire to secure by Letters Patent, is—

1. In clutch mechanism and in combination, a driving-pulley, clutches, two members, either of which can be driven by said pulley through the agency of said clutches, forks adapted to operate said clutches, a lever adapted to operate said forks and a rod having springs thereon, said rod being adapted to reciprocate and to operate said lever through the agency of said springs, so that the forks are moved quickly, the said springs serving to transmit the movement to the lever while in compressed condition, substantially as described.

2. In clutch mechanism and in combination, a driving-pulley, clutches, two members either of which can be driven by said pulley through the agency of said clutches, a shaft coupled to one of said members, a pinion coupled to the other of said members and mounted loosely on said shaft, forks adapted to operate said clutches, a lever adapted to operate said forks, a rod adapted to reciprocate and to operate said lever and coil-springs situated on said rod and adapted to transmit the movement to the lever while in compressed condition, substantially as and for the purpose described.

3. In a clutch mechanism, in combination, a pulley $h$ mounted loosely on a shaft, an incomplete ring $n$ carried by a disk $p$ keyed on the said shaft and adapted to engage as a clutch with the rim of said pulley, an incomplete ring $m$ carried by a pinion $v$ mounted loosely on said shaft and adapted to engage as a clutch with the rim of said pulley, forks 10 and 9 adapted to put said rings $n$ and $m$ in and out of gear with said rim, a lever 14 adapted to actuate said forks and a reciprocating rod 16 having springs thereon, said rod being adapted to actuate said lever through the agency of said springs, substantially as described with reference to the accompanying drawings.

4. In a clutch mechanism, in combination, a reciprocating rod, collars 19, 21 fixed on said rod, a clutch-actuating lever 14 having a free end situated between said collars, a spring-actuated pin carried by said lever, a fixed member having holes therein in which said pin is adapted to engage, and coil-springs 18, 22 situated on said rod between the free end of the said lever and the said collars, substantially as and for the purpose described.

In witness whereof we have hereunto set our hands in presence of two witnesses.

WILLIAM DUNSTAN FORD-SMITH.
THEODORE COVENTRY.

Witnesses:
ROBERT MORRISON NEILSON,
VIVIAN ARTHUR HUGHES.